US010771569B1

(12) United States Patent
Wang

(10) Patent No.: US 10,771,569 B1
(45) Date of Patent: Sep. 8, 2020

(54) NETWORK COMMUNICATION CONTROL METHOD OF MULTIPLE EDGE CLOUDS AND EDGE COMPUTING SYSTEM

(71) Applicant: INDUSTRIAL TECHNOLOGY RESEARCH INSTITUTE, Hsinchu (TW)

(72) Inventor: Wei-Cheng Wang, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 16/714,200

(22) Filed: Dec. 13, 2019

(51) Int. Cl.
G06F 15/173 (2006.01)
G06F 11/00 (2006.01)
H04L 29/08 (2006.01)
H04W 4/50 (2018.01)
H04W 24/02 (2009.01)
H04L 12/24 (2006.01)
H04L 29/06 (2006.01)

(52) U.S. Cl.
CPC ............ H04L 67/148 (2013.01); H04W 4/50 (2018.02); H04W 24/02 (2013.01)

(58) Field of Classification Search
USPC ................................. 709/223–232
See application file for complete search history.

(56) References Cited

U.S. PATENT DOCUMENTS 10,581,690 B2 * 3/2020 Salgueiro ................ H04L 67/12
2005/0069207 A1 * 3/2005 Zakrzewski ........... G06K 9/629
382/190
(Continued)

FOREIGN PATENT DOCUMENTS

CN 103825881 A 5/2014
TW I627872 B 6/2018
(Continued)

OTHER PUBLICATIONS

Sardis et al. "Dynamic Edge-Caching for Mobile Users: Minimising Inter-AS traffic by Moving Cloud Services and VMs" (2014 IEEE) May 13, 2014.
(Continued)

Primary Examiner — Jude Jean Gilles
(74) Attorney, Agent, or Firm — Maschoff Brennan

(57) ABSTRACT

A network communication control method of multiple edge clouds comprises providing a terminal device with a target service by a first edge computing platform, determining that there is a service abnormal situation in the first edge computing platform by a central control platform, re-allocating the target service to a second edge computing platform and generating offload information and a target service location according to the service abnormal situation, the target service and operational information of the second edge computing platform by the central control platform, transmitting the offload information to the second edge computing platform by the central control platform, and transmitting the target service location to the terminal device by the first edge computing platform or the second edge computing platform so as to allow the terminal device to have a communication connection with the second edge computing platform according to the target service location.

20 Claims, 7 Drawing Sheets

(56) References Cited

U.S. PATENT DOCUMENTS

| | | | |
|---|---|---|---|
| 2005/0273668 A1* | 12/2005 | Manning | H04L 12/66 714/39 |
| 2013/0166712 A1* | 6/2013 | Chandramouli | H04L 43/045 709/223 |
| 2013/0227672 A1* | 8/2013 | Ogg | H04L 63/1416 726/12 |
| 2018/0173570 A1* | 6/2018 | Chintalapally | H04L 63/08 |
| 2018/0242204 A1* | 8/2018 | Zhu | H04W 36/00 |
| 2018/0351876 A1* | 12/2018 | Ren | H04L 47/808 |
| 2019/0028934 A1 | 1/2019 | Kuure et al. | |
| 2019/0158606 A1 | 5/2019 | Bohan et al. | |
| 2020/0008044 A1* | 1/2020 | Poornachandran | H04W 24/08 |
| 2020/0099742 A1* | 3/2020 | Puente Pestana | H04L 67/1021 |
| 2020/0137078 A1* | 4/2020 | Tewari | H04L 9/0897 |

FOREIGN PATENT DOCUMENTS

| | | |
|---|---|---|
| TW | 201909667 A | 3/2019 |
| WO | 2017100640 A1 | 6/2017 |

OTHER PUBLICATIONS

Liu, H., "Mobile Edge Cloud System: Architectures, Challenges, and Approaches" IEEE Systems Journal, vol. 12, No. 3, Sep. 2018.
Sciancalepore et al. "A double-tier MEC-NFV architecture: Design and optimization" (2016 IEEE) Oct. 31, 2016.
Wang et al. "Dynamic service migration in mobile edge-clouds" (2015 IFIP) May 20, 2015.
Zhang et al. "Mobile edge computing and field trial results for 5G low latency scenario" (2016).
Jararweh et al. "The future of mobile cloud computing: Integrating cloudlets and Mobile Edge Computing" (2016 ICT) May 16, 2016.

\* cited by examiner

NETWORK COMMUNICATION CONTROL METHOD OF MULTIPLE EDGE CLOUDS AND EDGE COMPUTING SYSTEM

BACKGROUND

1. Technical Field

This disclosure relates to a network communication control method, and particularly to a network communication control method of multiple edge clouds.

2. Related Art

With the popularity of mobile devices, the widespread use of Internet services, such as video streaming, virtual reality, self-driving, etc., and the increasing of expanding business services to Internet services in various industries, the demand for mobile network traffic continues increasing, so the load traffic of the general backhaul network is not enough, and the remote cloud computing center cannot handle the huge amount of computing. The conventional network architecture faces considerable challenges in the case of increasingly developed communications technologies.

In response to the above situation, the architecture of mobile edge computing (MEC) has been proposed to solve the problem of increasing traffic demand and computational complexity. As literally, the mobile edge computing provides the cloud computing and the environment of information technology (IT) services at the edge of the mobile network. The main concepts of the mobile edge computing are to reduce the computing load of core network devices and to provide a platform for mobile operators to create specific mobile experience for customers. However, when an abnormal situation occurs in the mobile edge computing architecture, it often needs to re-build the entire communication environment, which takes a lot of time, and thus the user experience must be not good.

SUMMARY

According to an embodiment of this disclosure, a network communication control method of multiple edge clouds is applied to a first edge computing platform, a second edge computing platform and a central control platform, wherein the central control platform performs information transmission with the first edge computing platform and the second edge computing platform. The network communication control method comprises providing a terminal device with a target service by the first edge computing platform, determining that there is a service abnormal situation in the first edge computing platform by the central control platform, re-allocating the target service to the second edge computing platform and generating offload information and a target service location according to the service abnormal situation, the target service and operational information of the second edge computing platform by the central control platform, transmitting the offload information to the second edge computing platform by the central control platform, and transmitting the target service location to the terminal device by the first edge computing platform or the second edge computing platform so as to allow the terminal device to have a communication connection with the second edge computing platform according to the target service location. The offload information comprises an identity of the terminal device and an identity of the target service at least.

According to an embodiment of this disclosure, an edge computing system comprises an edge computing device and a central control device having a communication connection with the edge computing device. The edge computing device is configured to provide a terminal device with a target service. The central control device is configured to re-allocate the target service to another edge computing device and generate offload information and a target service location according to a service abnormal situation, the target service and operational information of the another edge computing device when determining that there is the service abnormal situation in the edge computing device, and configured to transmit the offload information to the another edge computing device, and to instruct the edge computing device or the another edge computing device to transmit the target service location to the terminal device, so as to allow the terminal device to have a communication connection with the another edge computing device according to the target service location. The offload information comprises an identity of the terminal device and an identity of the target service at least.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
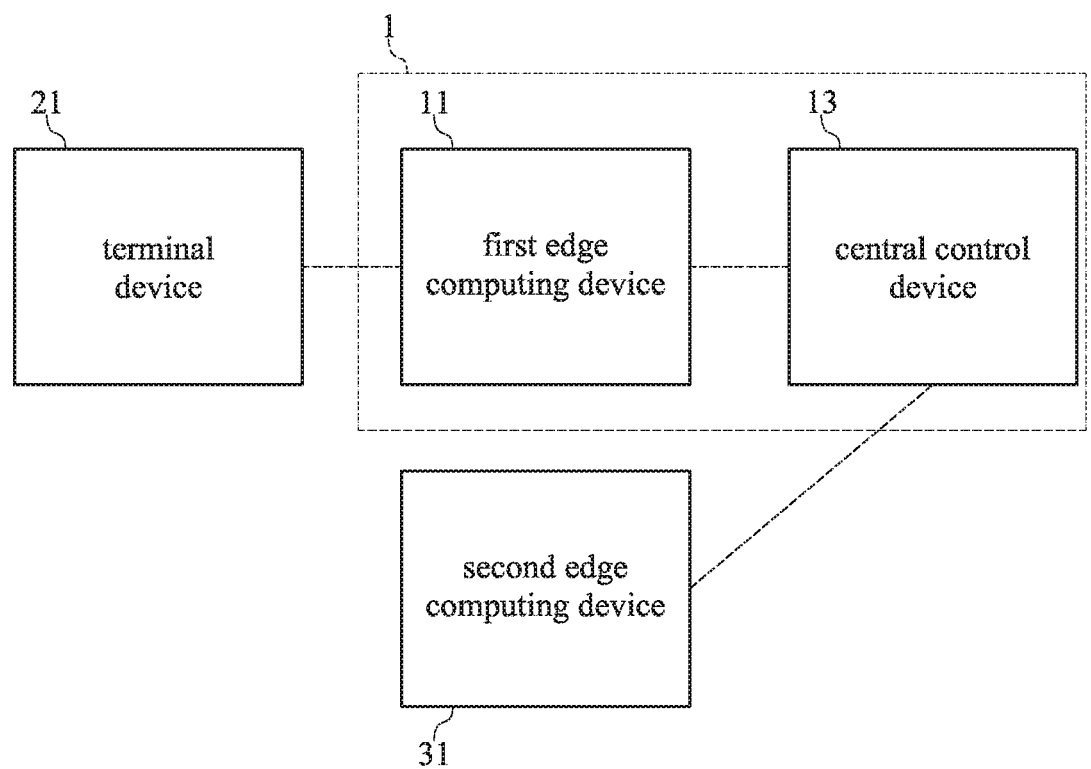
FIG. 1 is a schematic diagram of a communication environment of an edge computing system according to an embodiment of this disclosure.
Figure 2:
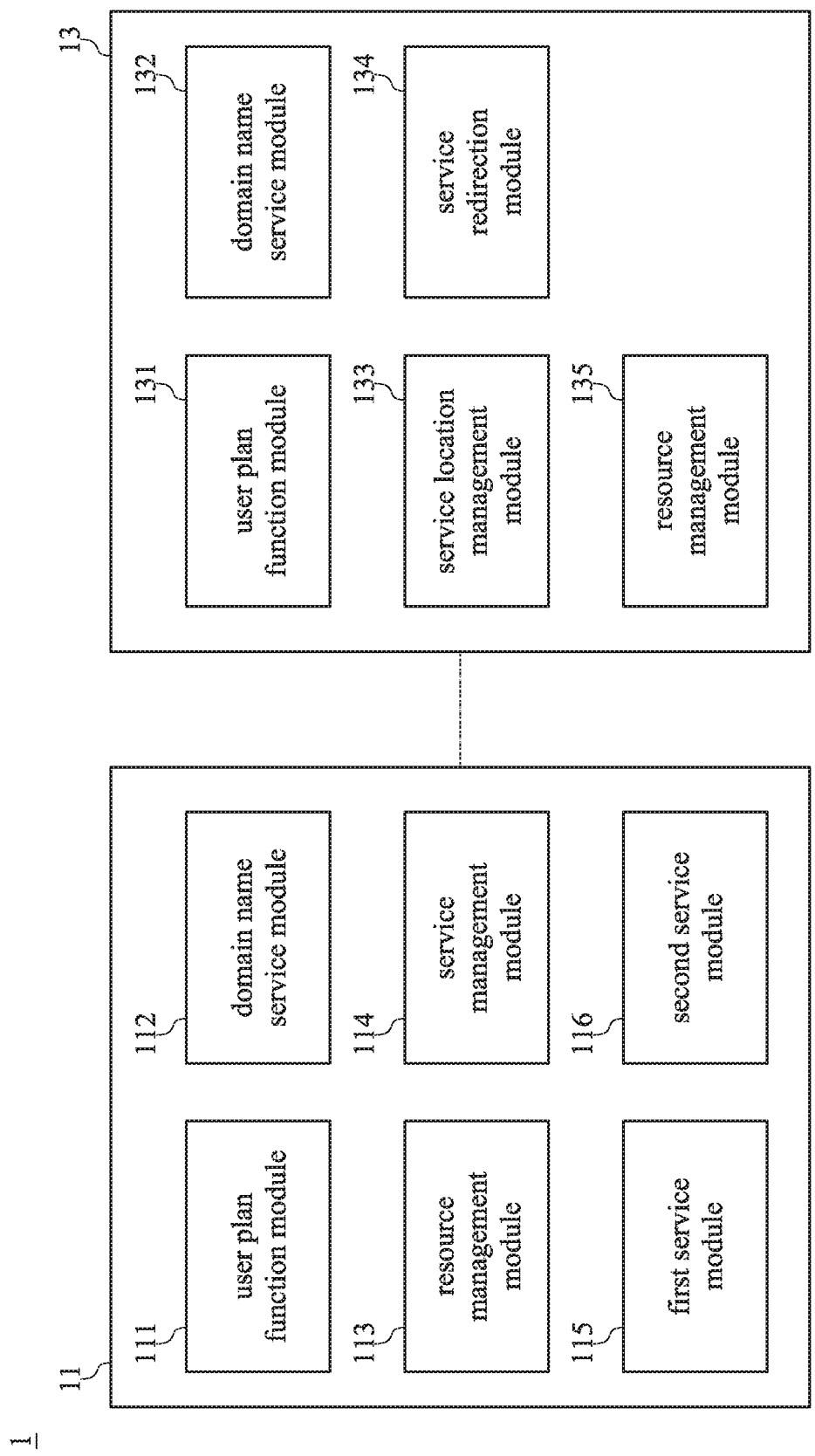
FIG. 2 is a functional block diagram of an edge computing system according to an embodiment of this disclosure.

This disclosure provides an edge computing system, please refer to FIG. 1 and FIG. 2, wherein FIG. 1 is a schematic diagram of a communication environment of an edge computing system according to an embodiment of this disclosure, and FIG. 2 is a functional block diagram of an edge computing system according to an embodiment of this disclosure. As shown in FIG. 1, the edge computing system 1 comprises a first edge computing device 11 and a central control device 13 that have a communication connection with each other. The edge computing system 1 can have a communication connection with a terminal device 21, and can also have a communication connection with a second edge computing device 31. In particular, the first edge computing device 11 can have a communication connection with the terminal device 21, and the central control device 13 can have a communication connection with the second edge computing device 31. It should be noted that the number of the terminal device 21 connected with the edge computing system 1 and the number of the second edge computing device 31 connected with the edge computing system 1 as shown in FIG. 1 are merely exemplified. The edge computing system 1 can also be connected with multiple terminal devices 21, and connected with multiple second edge computing devices 31. Moreover, the second edge computing device 31 can be connected with one or more terminal device 21.

The first edge computing device 11 can be a mobile edge computing (MEC) cloud which can be abbreviated to "edge cloud". The first edge computing device 11 is configured to provide the terminal device 21 with one or more types of services. The first edge computing device 11 can be connected with the terminal device 21 via a base station. In terms of network architecture, the first edge computing device 11 is located at the network edge and is relatively close to the terminal device 21 of the user end. More specifically, a cloud server or the Internet can be the network core in the network architecture, and the terminal device 21 can be located on the periphery of the network architecture and connected to the cloud server or the Internet via the network. The network edge can represent the boundary between the Internet and the local area network (LAN) where the terminal device 21 is located, but is not limited to this. In particular, the first edge computing device 11 can be a single server with computation capability, or be composed of multiple servers having different functions and connected with each other. The terminal device 21 is a mobile electronic device such as a smart phone, a tablet, a laptop, etc., which is not limited in this disclosure.

More particularly, as shown in FIG. 2, the first edge computing device 11 can comprise a user plan function (UPF) module 111, a domain name service (DNS) module 112, a resource management module 113, service management module 114, a first service module 115 and a second service module 116. The user plan function module 111 of the first edge computing device 11 can be connected with the first service module 115 and the second service module 116 via N6 interfaces respectively, and can also be connected with a base station via N3 interface and be connected with the terminal device 21 via the base station. The domain name service module 112 can respond to the service location request from the terminal device 21 and wake up the corresponding service. For example, when a user sends a request for the service location of "www.youtube.com" via the terminal device 21, the domain name service module 112 responds with "10.14.188.xxx" to the terminal device 21 and wakes up the service of YouTube. The resource management module 113 can monitor, organize and manage the resource condition of the first edge computing device 11. The service management module 114 can monitor the operational states of the first service module 115 and the second service module 116, monitor the service running status, and report back when an error occurs, and can further create or enable a new service module (i.e. a service module other than the first and second service modules 115 and 116 for this embodiment). The first service module 115 and the second service module 116 can each provide one or more network services.

The aforementioned modules can be implemented by multiple servers that independently set but connected with each other, or be implemented by multiple applications running on one or more servers. This disclosure does not limit the number of physical servers for the implementation of the aforementioned modules. Moreover, it should be noted that FIG. 2 exemplarily illustrates that the first edge computing device 11 comprises two service modules (the first service module 115 and the second service module 116), but the first edge computing device 11 may comprise one or more than two service modules in other embodiments, and the enabling state of the service modules can be dynamically adjusted, wherein the enabling state indicates whether a service can be provided, for example. By providing services to the terminal device 21 by the service modules of the first edge computing device 11, the more complicated operations can be performed by the first edge computing device 11, so that the computational load on the terminal device 21 may be reduced. Moreover, the first edge computing device 11 can also provide services for storing or processing information that the terminal device 21 may access. The above services are merely illustrative, but the services that the first edge computing device 11 can provide are not limited to these.

For example, the central control device 13 is an orchestrator, particularly the data center of the 5G core, for information transmission with the first edge computing device 11 and the second edge computing device 31. The second edge computing device 31 can have the same configuration and functions as the aforementioned first edge computing device 11 has. The second edge computing device 31 can be a mobile edge computing cloud, configured to provide a terminal device with one or more services. In particular, the second edge computing device 31 can be a single server with computation capability, or be composed of multiple servers having different functions and connected with each other. The second edge computing device 31 can comprise a user plan function module, a domain name service module, a resource management module, a service management module and one or more service modules as mentioned before. The second edge computing device 31 can differ from the first edge computing device 11 in the resource condition (e.g. the amount of resources), the number and types of services that can be provided, and the latency generated as providing a service to a certain terminal device.

In addition to having communication connections with the first and second edge computing devices 11 and 31, the central control device 13 can also have communication connections with more edge computing devices respectively, so as to collect information of each edge computing device, such as the device identity (ID), the device location (e.g. the IP of the edge computing device), the ID(s) of the service(s) that can be provided, the location(s) of the service(s) that can be provided (e.g. the IP(s) of the corresponding service module(s)), the ID(s) of the connected terminal device(s), the resource condition, the latency, etc., and particularly to collect these types of information periodically. The central control device 13 can configure communication connection relationships between multiple terminal devices and multiple edge computing devices according to the collected information. In particular, the central control device 13 of this disclosure can allocate a terminal device to a specific edge computing device according to the requirements of the terminal device, and can perform re-allocation according to the operational condition of the edge computing device, and the further implementation will be described later.

Further explaining the configuration of the central control device 13, as shown in FIG. 2, the central control device 13 can comprise a user plan function module 131, a domain name service module 132, a service location management module 133, a service redirection module 134 and a resource management module 135. The user plan function module 131 of the central control device 13 can be connected with the user plan function module 111 of the first edge computing device 11 via N9 interface. Similarly, the user plan function module 131 can also be connected with other one or more edge computing devices via N9 interfaces. The domain name service module 132 has the same function as the aforementioned domain name service module 112, so the details of the function are not repeated here. The service location management module 133 can have a database for recording the service(s) that each edge computing device connected with the central control device 13 can provide, wherein the recording method is, for example, recording the ID of each service. The service location management module 133 can perform the re-allocation of a service in conjunction with the service redirection module 134 or the resource management module 135, wherein the further implementation of the re-allocation will be described later. The above modules can be multiple servers that independently set but connected with each other, or be multiple applications running on one or more servers. This disclosure does not limit the number of physical servers for running the aforementioned modules. In other words, the central control device 13 can be implemented by a single server, or be composed of multiple servers having different functions. In another embodiment, the central control device 13 can also be a mobile edge computing cloud with a central control function, and can be connected with the terminal device 21 via a base station and provide one or more services to the terminal device 21. In this embodiment, besides the foregoing multiple modules, the central control device 13 can further comprise a service management module and one or more service modules.

Figure 3:
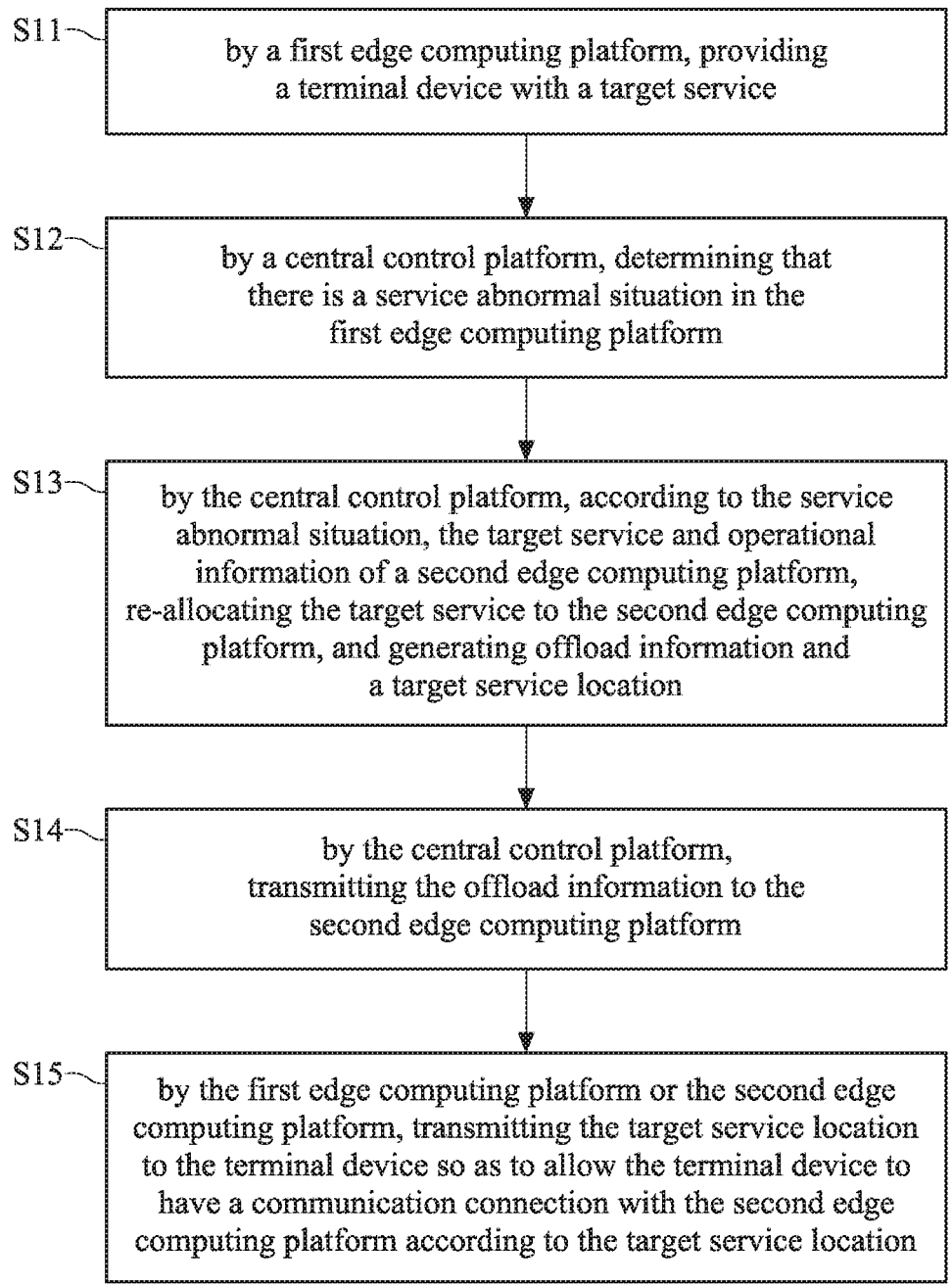
FIG. 3 is a flow chart of a network communication control method of multiple edge clouds according to an embodiment of this disclosure.

This disclosure also provides a network communication control method of multiple edge clouds. Please refer to FIGS. 1-3, wherein FIG. 3 is a flow chart of a network communication control method of multiple edge clouds according to an embodiment of this disclosure. As shown in FIG. 3, the network communication control method of multiple edge clouds can comprise step S11: by a first edge computing platform, providing a terminal device with a target service; S12: by a central control platform, determining that there is a service abnormal situation in the first edge computing platform; step S13: by the central control platform, according to the service abnormal situation, the target service and operational information of a second edge computing platform, re-allocating the target service to the second edge computing platform, and generating offload information and a target service location; step S14: by the central control platform, transmitting the offload information to the second edge computing platform; and step S15: by the first edge computing platform or the second edge computing platform, transmitting the target service location to the terminal device so as to allow the terminal device to have a communication connection with the second edge computing platform according to the target service location.

In an embodiment, the above first edge computing platform, second edge computing platform and central control platform can be respectively implemented by the aforementioned first edge computing device 11, second edge computing device 31 and central control device 13 in FIGS. 1 and 2. In another embodiment, the first edge computing platform, the second edge computing platform and the central control platform can each be an application that is run by a virtual machine in a server. In the following, the first edge computing platform, the second edge computing platform and the central control platform in the network communication control method of multiple edge clouds shown in FIG. 3 will be exemplarily described to be respectively implemented by the first edge computing device 11, the second edge computing device 31 and the central control device 13.

In step S11, the first edge computing device 11 provides the terminal device 21 with a target service. For example, the target service involves in artificial intelligence, virtual reality (VR), augmented reality (AR), automatic driving or other application services. This disclosure does not intend to limit the type of the target service. In particular, the communication connection between the first edge computing device 11 and the terminal device 21 is previously determined by the central control device 13 according to the operational information of the first edge computing device 11, wherein the operational information comprises the resource condition and the latency of the operation of the first edge computing device 11 when providing the target service. In step S12, the central control device 13 determines there is a service abnormal situation occurring in the first edge computing device 11, wherein the service abnormal situation can indicate that the target service is suspended (called "Service Down"), the target service is swapped out (called "Service Swap Out"), or the platform is disabled (called "MEC Down"). In response to the service abnormal situation, in steps S13-S15, the central control device 13 performs re-allocation so as to instruct another edge computing device (second edge computing device 31) to provide the target service (i.e. the service originally provided by the first edge computing device 11) to the terminal device 21.

Figure 4:
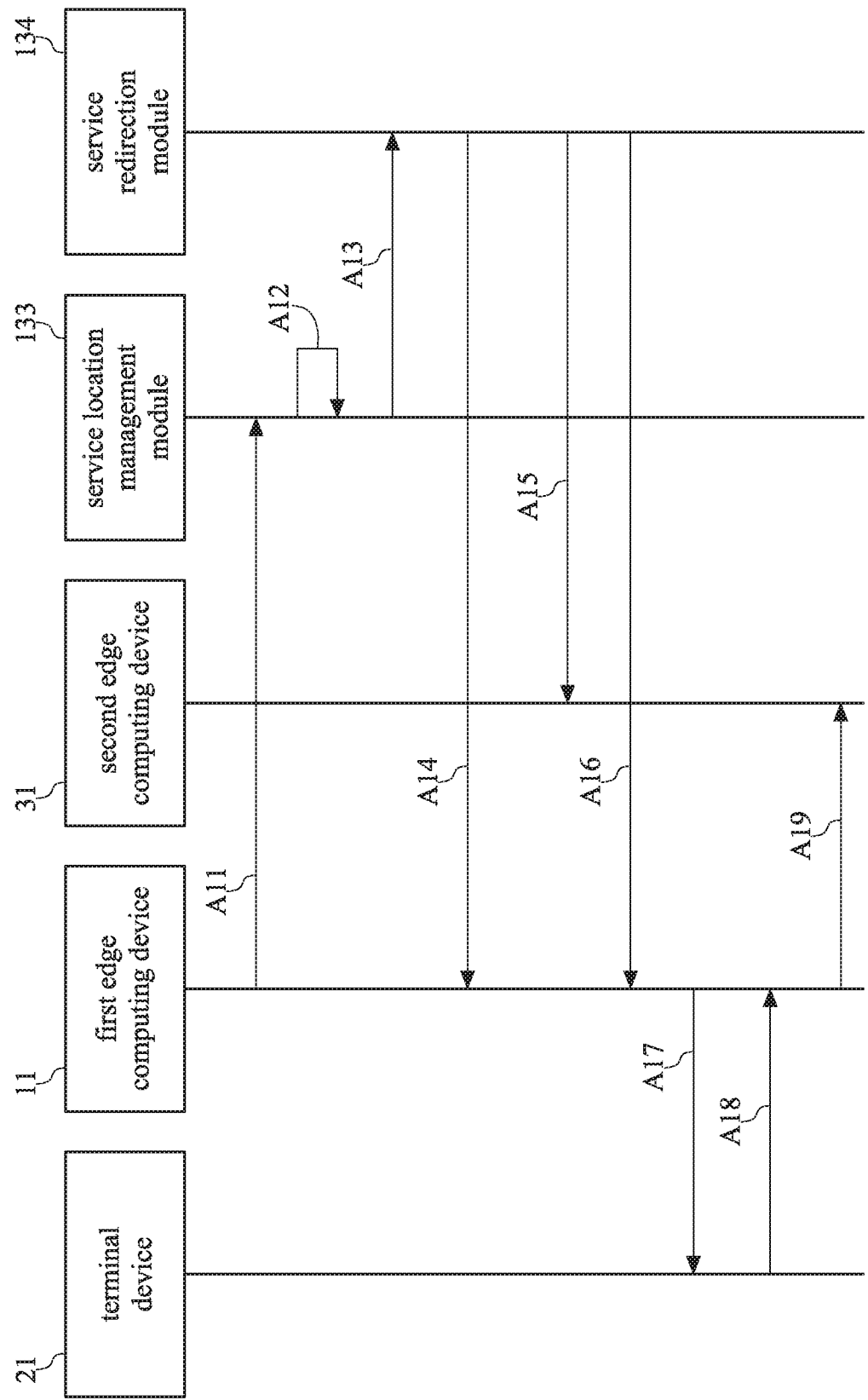
FIG. 4 is a schematic diagram of signal transmission in a network communication control method of multiple edge clouds according to an embodiment of this disclosure.

Further explaining steps S12-S15 in response to different service abnormal situations, please refer to FIGS. 1-4, wherein FIG. 4 is a schematic diagram of the signal transmission in a network communication control method of multiple edge clouds according to an embodiment of this disclosure. In the operational state in which the service abnormal situation indicates Service Down or Service Swap Out, as shown in step A11 of FIG. 4, the central control device 13 can receive a service invalidation signal associated with the service abnormal situation from the first edge computing device 11, and thereby determine that the abnormal situation occurs in the first edge computing device 11.

More specifically, Service Down can represent the situation in which the service module originally providing the target service to the terminal device 21 cannot provide the target service anymore since the service module is disabled. In this situation, the service management module 114 can generate a corresponding service invalidation signal and provide the corresponding service invalidation signal to the service location management module 133 of the central control device 13. On the other hand, Service Swap Out can represent the situation in which the service management module 114 of the first edge computing device 11 swaps the service with the lower priority in a priority order out when the resource management module 113 of the first edge computing device 11 determines that the resource is insufficient. For example, the service management module 114 can swap a service out by disabling the service module corresponding to the service or instructing this service module to provide another service. The priority order can be set according to the actual requirements and is not limited in this disclosure. When the service that the service management module 114 decides to swap out is the target service originally provided to the terminal device 21, the service management module 114 generates a corresponding service invalidation signal and provides the corresponding service invalidation signal to the service location management module 133 of the central control device 13. The service invalidation signal corresponding to Service Down or Service Swap Out can include the ID of the first edge computing device 11, the ID of the target service and the ID of the terminal device 21 originally connected with the edge computing platform where the abnormal situation occurs.

When the service location management module 133 of the central control device 13 receives the service invalidation signal and then knows that the service abnormal situation occurs in the first edge computing device 11, the service location management module 133 and the service redirection module 134 can accordingly perform re-allocation. In this embodiment, the re-allocation comprises a relocation procedure and a redirection procedure. The relocation procedure (step A12) can comprises: selecting the edge computing device(s) that are able to provide the target service to be the edge computing platform candidate(s), and deciding a target edge computing platform according to the operational information of each edge computing platform candidate. As aforementioned, the central control device 13 can periodically collect the information, such as the resource condition, the latency generated as providing each service, etc., of the edge computing device(s) connected with the central control device 13. In particular, the service location management module 133 of the central control device 13 can obtain the ID of the target service from the service invalidation signal, select the edge computing device(s) comprising the service module with the ID of the target service to be the edge computing platform candidate(s), and then select the edge computing platform candidate with the best operational information to be the target edge computing device, wherein the target edge computing device is the edge computing platform excepted to take over the job of providing the target service to the terminal device 21.

The judgement of the best operational information can have different standard depending on the type of the target service. For example, for a virtual reality service, the condition of bandwidth resource can be a primary consideration, but this disclosure is not limited to this. Moreover, the number of the terminal device(s) 21 requesting for the target service is also one of the important considerations. The service location management module 133 can acquire the number of the terminal device(s) 21 requesting for the target service from the ID(s) of the terminal device(s) 21 included in the service invalidation signal, and determine whether the resource condition of each edge computing platform candidate is sufficient to provide the target service to the terminal device(s) 21. More specifically, in the mobile edge computing environment, the latency generated as providing the target service can be the primary consideration. In particular, the service location management module 133 can select the edge computing platform candidate with the lowest latency from the edge computing platform candidates of which the resource conditions meet a certain standard. More particularly, the certain standard can refer to the minimum threshold for providing the target service to the terminal device 21.

When the service location management module 133 decides the target edge computing platform by the above the relocation procedure, the service location management module 133 generates a redirection request and transmits the redirection request to the service redirection module 134 (step A13). The redirection request includes the ID of the target edge computing platform, the ID of the target service and the ID of the terminal device 21. In the embodiment of FIG. 3 as aforementioned, the second edge computing device 31 is selected by the service location management module 133 to be the target edge computing platform. Therefore, in this embodiment, the redirection request includes the ID of the second edge computing device 31. The service redirection module 134 transmits the redirection information to the first edge computing device 11 according to the redirection request (step A14), which is the redirection procedure mentioned before. The redirection information can include the ID of the second edge computing device 31, the ID of the terminal device 21, and the ID of the target service. In particular, the user plan function module 111 of the first edge computing device 11 can propose a request for establishing a connection between the first and second edge computing device 11 and 31 for the terminal device 21 to the user plan function module of the second edge computing device 31 according to the redirection information, wherein the connection is specifically a session connection for terminal device 21 that is established through the N9 interface between the first and second edge computing device 11 and 31 for the terminal device 21. More particularly, the first edge computing device 11 returns an acknowledgement (ACK) message to the service redirection module 134 as receiving redirection information, in order to indicate that the redirection information is successfully transmitted.

Through the above procedure, the central control device 13 re-allocates the target service to the second edge computing device 31, and generates offload information and the location of the target service (called "target service location"), and then transmits the offload information to the second edge computing device 31 and transmits the target service location to the terminal device 21. In particular, the service redirection module 134 of the central control device 13 transmits the offload information to the second edge computing device 31 (step A15). More particularly, the service redirection module 134 does not perform step A15 until the first edge computing device 11 returns the acknowledgement message corresponding to step A14. In this embodiment, the offload information comprises the ID of the first edge computing device 11, the ID of the terminal device 21 and the ID of the target service. The second edge computing device 31 can agree with the aforementioned request for establishing the connection between the first and second edge computing device 11 and 31 for the terminal device 21 according to the offload information. In short, the first edge computing device 11 and the second edge computing device 31 can respectively obtain the redirection information and the offload information from the central control device 13, and accordingly establish the connection with each other wherein the connection is associated with the terminal device 21 and the target service. Moreover, when the second edge computing device 31 receives the offload information, the second edge computing device 31 can obtain the location information (e.g. IP) of the service module corresponding to the ID of the target service in the offload information, regard the location information as the target service location, and return an acknowledge message to the service redirection module 134 in order to indicate that the offload information is successfully transmitted. More specifically, this acknowledge message corresponding to step A15 includes the target service location.

The service redirection module 134 of the central control device 13 transmits the target service location to the terminal device 21 through the first edge computing device 11. In particular, the service redirection module 134 can wait for the second edge computing device 31 to return the acknowledge message corresponding to step A15, and then acquire the target service location from the target service location, and then transmit the ID of the terminal device 21 and the target service location to the first edge computing device 11 (step A16). The first edge computing device 11 can obtain the target service location from the central control device 13, and then transmit the target service location to the terminal device 21 according to the ID of the terminal device 21 (step A17). More specifically, the information transmission of the above steps A16 and A17 can be performed by domain name service notification (DNS Notify), HTTP 301 or HTTP 302. After the terminal device 21 obtains the target service location, the terminal device 21 can accordingly connect to the service module, which can provide the target service, of the second edge computing device 31 through the connection between the first edge computing device 11 and the second edge computing device 31 (steps A18 and A19).

Figure 5:
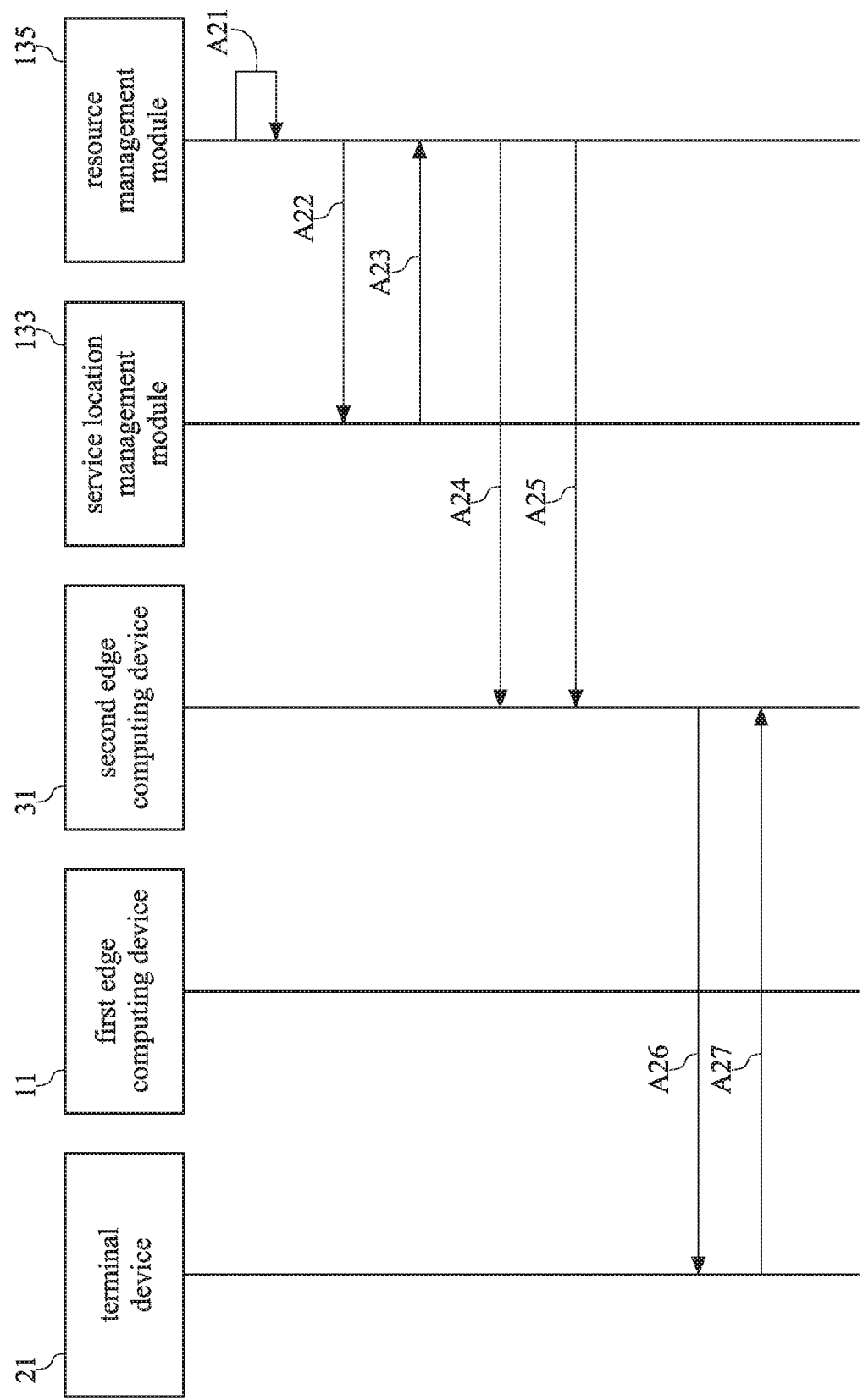
FIG. 5 is a schematic diagram of signal transmission in a network communication control method of multiple edge clouds according to another embodiment of this disclosure.

In addition to handling the service abnormal situation of Service Down or Service Swap Out as described above, the network communication control method as shown in FIG. 3 can further handle the service abnormal situation of MEC Down. Please refer to FIGS. 1-3 and 5, wherein FIG. 5 is a schematic diagram of the signal transmission in a network communication control method of multiple edge clouds according to another embodiment of this disclosure. In the embodiment of FIG. 5, the resource management module 135 of the central control device 13 can periodically obtains the information of the first edge computing device 11 from the first edge computing device 11. When the resource management module 135 determines that the resource management module 135 has not received information from the first edge computing device 11 for a specific length of time (step A21), the resource management module 135 determines that the first edge computing device 11 is disabled. Then, the central control device 13 can perform re-allocation. In this embodiment, the resource management module 135 generates a relocation request according to the service abnormal situation and transmits the relocation request to the service location management module 133 (step A22). In particular, the relocation request can include the ID of the first edge computing device 11 and the ID of the terminal device 21 originally connected with the first edge computing device 11.

The service location management module 133 performs the relocation procedure according to the relocation request to generate a relocation reply and return the relocation reply to the resource management module 135 (step A23). As aforementioned, the service location management module 133 can record the ID(s) of the service(s) that each edge computing device connected with the central control device 13 owns. Therefore, the relocation procedure can comprise determining the service(s) that the first edge computing device 11 originally owns according to the ID of the first edge computing device 11, and regarding each of the service(s) as the target service. The subsequent implementations of selecting the edge computing platform candidates and the target edge computing platform are the same as those in the embodiment of FIG. 4 as aforementioned, and are not repeated here. The relocation reply generated by the service location management module 133 can include the ID of the target edge computing platform, the ID of the target service and the ID of the terminal device 21. In the embodiment of FIG. 3 as aforementioned, the second edge computing device 31 is selected to be the target edge computing platform by the service location management module 133, so the relocation reply in this embodiment include the ID of the second edge computing device 31.

Through the above procedure, the central control device 13 re-allocates the target service to the second edge computing device 31, and generates offload information and the location of the target service (called "target service location"), and then transmits the offload information to the second edge computing device 31 and transmits the target service location to the terminal device 21. In particular, the resource management module 135 of the central control device 13 generates the offload information including the ID of the terminal device 21 and the ID of the target service according to the relocation reply, and transmits the offload information to the second edge computing device 31 (step A24). Accordingly, the second edge computing device 31 can know that it is going to provide the target service to the terminal device 21 according to offload information, and when the second edge computing device 31 receives the offload information, the second edge computing device 31 can obtain the location information (e.g. IP) of the service module corresponding to the ID of the target service in the offload information, regard the location information as the target service location, and return an acknowledge message to the resource management module 135 in order to indicate that the offload information is successfully transmitted. More specifically, this acknowledge message includes the target service location.

The resource management module 135 of the central control device 13 transmits the target service location to the terminal device 21 through the second edge computing device 31. In particular, the resource management module 135 can wait for the second edge computing device 31 to return the acknowledge message, and then acquire the target service location from the target service location, and then transmit the ID of the terminal device 21 and the target service location to the second edge computing device 31 (step A25). The second edge computing device 31 can obtain the target service location from the central control device 13, and then transmit the target service location to the terminal device 21 according to the ID of the terminal device 21 (step A26). More specifically, the information transmission of the above steps A25 and A26 can be performed by DNS Notify, HTTP 301 or HTTP 302. After the terminal device 21 obtains the target service location, the terminal device 21 can accordingly connect to the service module, which can provide the target service, of the second edge computing device 31 (step A27). More specifically, in this embodiment, before the edge computing platform for providing the target service is changed, the terminal device 21 is already connected with the first edge computing device 11 and the second edge computing device 31. More specifically, the base station connected with the terminal device 21 is originally connected with the first edge computing device 11 and the second edge computing device 31, wherein the first edge computing device 11 serves as the main edge computing platform, and the second edge computing device 31 serves as a backup edge computing platform for taking over the base station when the main edge computing platform fails.

Figure 6:
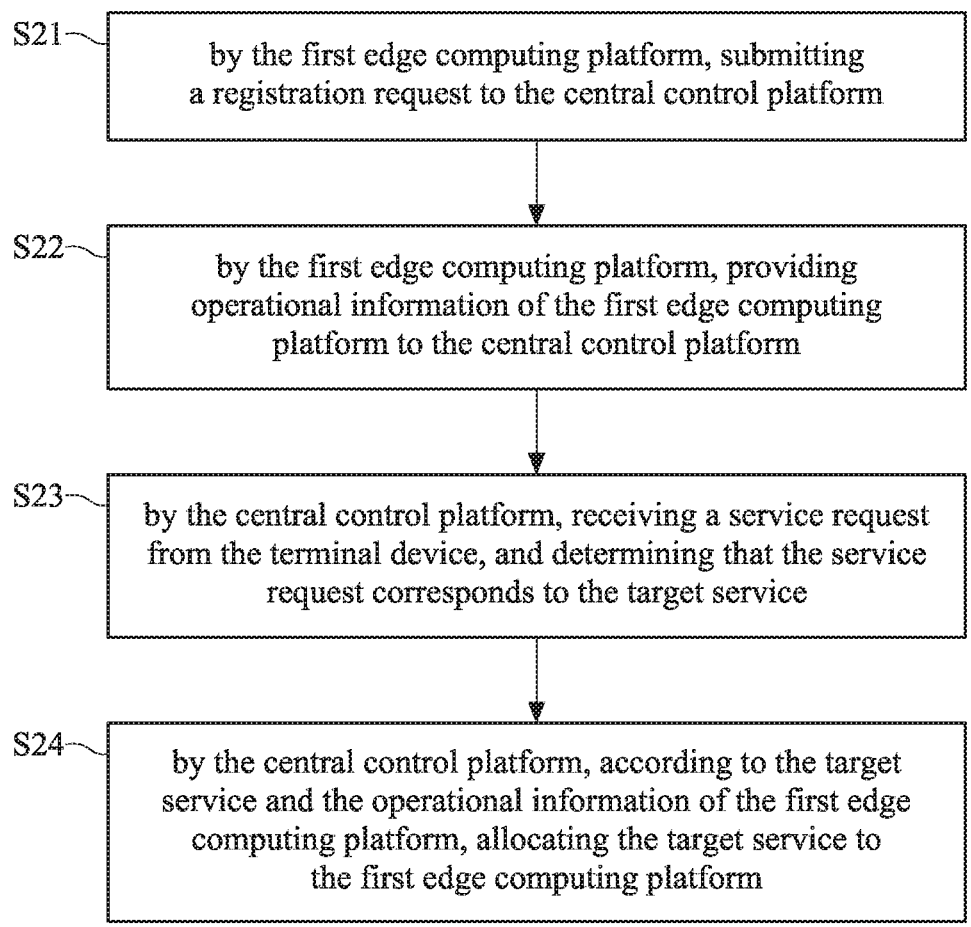
FIG. 6 is a partial flow chart of a network communication control method of multiple edge clouds according to an embodiment of this disclosure.

In an embodiment, before the first edge computing device 11 provides the terminal device with the target service (i.e. step S11 in FIG. 3), the network communication control method of multiple edge clouds can further comprise a procedure of registering an edge computing platform/device and a procedure of allocating the service request from the terminal device 21. Please refer to FIGS. 1, 3 and 6, wherein FIG. 6 is a partial flow chart of a network communication control method of multiple edge clouds according to an embodiment of this disclosure. Before step S11 shown in FIG. 3, the network communication control method of multiple edge clouds can further comprise the steps shown in FIG. 6, including step S21: by the first edge computing platform, submitting a registration request to the central control platform; step S22: by the first edge computing platform, providing operational information of the first edge computing platform to the central control platform; step S23: by the central control platform, receiving a service request from the terminal device, and determining that the service request corresponds to the target service; and step S24: by the central control platform, according to the target service and the operational information of the first edge computing platform, allocating the target service to the first edge computing platform.

In particular, the communication environment shown in FIG. 1 can be established by steps S21-S24. Illustrating by FIG. 1, in steps S21 and S22, the first edge computing device 11 submits a registration request to the central control device 13, and the central control device 13 can accordingly establish the connection between the first edge computing device 11 and the central control device 13. After the first edge computing device 11 is registered, the first edge computing device 11 can provide its operational information, including the resource condition, latency, etc., to the central control device 13. More specifically, the first edge computing device 11 periodically provide its operational information to the central control device 13. Moreover, before the re-allocation procedure is performed, the second edge computing device 31 can also submit a registration request to the central control device 13, and provide its operational information to the central control device 13 after registration. In addition, more edge computing devices can submit registration requests and their operational information to the central control device 13, which is not limited in this disclosure.

When the edge computing system 1 receives the service request from the terminal device 21, in steps S23 and S24, the central control device 13 determines that the service request corresponds to the target service, and performs allocation on the target service according to the target service and the operational information of each edge computing devices that has been registered. In particular, the domain name service module of the first edge computing device 11, the second edge computing device 31 or another edge computing device that have been registered at the central control device 13 can receive the service request (e.g. service location inquiry) from the terminal device 21 in the communication range, and the edge computing device that performs the above receiving step can then transmit its ID, the ID of its service, the ID of the terminal device 21 to the service location management module 133 of the central control device 13. In this embodiment, the central control device 13 allocates the target service to the first edge computing device 11 since the operational information of the first edge computing device 11 is the best operational information corresponding to the target service. The examples and descriptions of the judgement of the best operational information are the same as the judgement of the best operational information in the re-allocation procedure in the preceding embodiments, so they are not repeated here.

Moreover, as aforementioned, in an embodiment, the central control device 13 can be a mobile edge computing cloud with a central control function, and can be connected with the terminal device 21 via a base station and provide one or more services to the terminal device 21. In this embodiment, when the central control device 13 performs the allocation procedure or the re-allocation procedure as described in the preceding embodiments, the central control device 13 can regard itself as one of the choices for the target edge computing platform. More specifically, the central control device 13 can set its priority to be the lowest; that is, the central control device 13 determines whether it is suitable for providing the target service after determining that all the edge computing devices are not suitable for providing the target service. Moreover, the central control device 13 can generate and transmit an allocation failure signal to the terminal device 21 when determining that no edge computing device can provide the target service.

Figure 7:
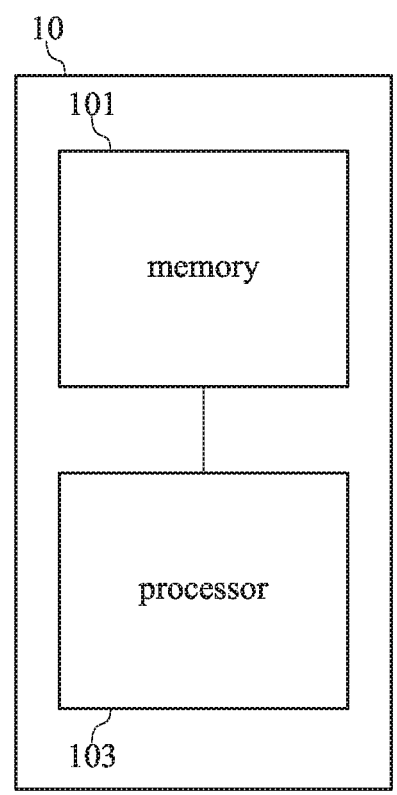
FIG. 7 is a functional block diagram of an edge computing device according to another embodiment of this disclosure.

This disclosure further provides a structure of an edge computing device. More specifically, the first edge computing device 11 and the central control device 13 can each have this device structure. Please refer to FIG. 7 which is a functional block diagram of an edge computing device according to another embodiment of this disclosure. As shown in FIG. 7, the edge computing device 10 comprises a memory 101 and a processor 103, wherein the processor 103 is electrically connected with the memory 101. For example, the memory 101 is a flash memory, a read-only memory, a magnetic memory or other non-volatile storage medium. The memory 101 stores a plurality of instructions. In particular, said plurality of instructions include at least the instructions corresponding to the steps performed by the first edge computing device 11/the central control device 13 as described in the preceding embodiments. The processor 103 is, for example, a central processing unit, a microcontroller, a programmable logic controller, etc. The processor 103 can execute the instructions stored in the memory 101 to execute the steps performed by the first edge computing device 11/the central control device 13 as described in the preceding embodiments.

In view of the above, this disclosure provides the edge computing system, the edge computing device and the network communication control method of multiple edge clouds applied to a centralized communication environment for re-allocating the edge computing platform that provides a service in response to various service abnormal situations, so that the entire communication environment may not need to be reconfigured when a service abnormal situation occurs. The edge computing system, the edge computing device and the network communication control method of multiple edge clouds of this disclosure may have the function of dynamic allocation without service interruption, and may also have the functions of load balancing and remote backup.

What is claimed is:

1. A network communication control method of multiple edge clouds, applied to a first edge computing platform, a second edge computing platform and a central control platform, wherein the central control platform performs information transmission with the first edge computing platform and the second edge computing platform, and the network communication control method comprising:
by the first edge computing platform, providing a terminal device with a target service;
by the central control platform, determining that there is a service abnormal situation in the first edge computing platform;
by the central control platform, according to the service abnormal situation, the target service and operational information of a second edge computing platform, re-allocating the target service to the second edge computing platform, and generating offload information and a target service location;

by the central control platform, transmitting the offload information to the second edge computing platform; and by the first edge computing platform or the second edge computing platform, transmitting the target service location to the terminal device so as to allow the terminal device to have a communication connection with the second edge computing platform according to the target service location;

wherein the offload information comprises an identity of the terminal device and an identity of the target service at least.

2. The network communication control method according to claim 1, wherein according to the service abnormal situation, the target service and the operational information of the second edge computing platform, re-allocating the target service to the second edge computing platform by the central control platform comprises:

according to the target service and operational information of each of one or more edge computing platform candidates, selecting the second edge computing platform from the one or more edge computing platform candidates; and generating redirection information according to the service abnormal situation and a result of the selecting, and transmitting the redirection information to the first edge computing platform.

3. The network communication control method according to claim 2, wherein the offload information further comprises an identity of the first edge computing platform, and the network communication control method further comprises:

by the first edge computing platform, establishing a connection with the second edge computing platform according to the redirection information.

4. The network communication control method according to claim 1, wherein transmitting the target service location to the terminal device by the first edge computing platform or the second edge computing platform comprises:

by the first edge computing platform, obtaining the target service location from the central control platform, and transmitting the target service location to the terminal device.

5. The network communication control method according to claim 1, wherein determining that there is the service abnormal situation in the first edge computing platform by the central control platform comprises:

by the central control platform, receiving a service invalidation signal associated with the service abnormal situation from the first edge computing platform;

wherein the service invalidation signal is generated when the first edge computing platform determines to swap out the target service according to a priority order.

6. The network communication control method according to claim 1, wherein determining that there is the service abnormal situation in the first edge computing platform by the central control platform comprises:

by the central control platform, receiving a service invalidation signal associated with the service abnormal situation from the first edge computing platform;

wherein the service invalidation signal is generated by the first edge computing platform when the target service is down.

7. The network communication control method according to claim 1, wherein the service abnormal situation indicates that the first edge computing platform is disabled, and transmitting the target service location to the terminal device by the first edge computing platform or the second edge computing platform comprises:

by the second edge computing platform, obtaining the target service location from the central control platform, and transmitting the target service location to the terminal device.

8. The network communication control method according to claim 1, wherein determining that there is the service abnormal situation in the first edge computing platform by the central control platform comprises:

by the central control platform, determining that the first edge computing platform is disabled when the central control platform determines that the central control platform has not received information from the first edge computing platform for a specific length of time.

9. The network communication control method according to claim 1, wherein according to the service abnormal situation, the target service and the operational information of the second edge computing platform, re-allocating the target service to the second edge computing platform by the central control platform comprises:

selecting one or more edge computing platform candidates that are able to provide the target service, wherein each of the one or more edge computing platform candidates has operational information, the second edge computing platform is included in the one or more edge computing platform candidates, and the operational information comprises a resource condition and latency corresponding to the target service; and determining that the operational information of the second edge computing platform is a best operational information, so selecting the second edge computing platform from the one or more edge computing platform candidates.

10. The network communication control method according to claim 1, before providing the terminal device with the target service by the first edge computing platform, further comprising:

by the first edge computing platform, submitting a registration request to the central control platform;

by the first edge computing platform, providing operational information of the first edge computing platform to the central control platform;

by the central control platform, receiving a service request from the terminal device, and determining that the service request corresponds to the target service; and by the central control platform, according to the target service and the operational information of the first edge computing platform, allocating the target service to the first edge computing platform.

11. An edge computing system, comprising:

an edge computing device configured to provide a terminal device with a target service; and a central control device having a communication connection with the edge computing device, wherein the central control device is configured to re-allocate the target service to another edge computing device and generate offload information and a target service location according to a service abnormal situation, the target service and operational information of the another edge computing device when determining that there is the service abnormal situation in the edge computing device, and configured to transmit the offload information to the another edge computing device, and to instruct the edge computing device or the another edge computing device to transmit the target service location to the terminal device, so as to allow the terminal device to have a communication connection with the another edge computing device according to the target service location;

wherein the offload information comprises an identity of the terminal device and an identity of the target service at least.

12. The edge computing system according to claim 11, wherein re-allocating the target service to the another edge computing device according to the service abnormal situation, the target service and the operational information of the another edge computing device performed by the central control device comprises:

according to the target service and operational information of each of one or more edge computing platform candidates, selecting the another edge computing device from the one or more edge computing platform candidates; and generating redirection information according to the service abnormal situation and a result of the selecting, and transmitting the redirection information to the edge computing device.

13. The edge computing system according to claim 12, the offload information further comprises an identity of the edge computing device, and the edge computing device is further configured to establish a connection with the another edge computing device according to the redirection information.

14. The edge computing system according to claim 11, wherein instructing the edge computing device or the another edge computing device to transmit the target service location to the terminal device performed by the central control device is performed by transmitting the target service location and the identity of the terminal device to the edge computing device.

15. The edge computing system according to claim 11, wherein the edge computing device is further configured to generate a service invalidation signal when determining to swap out the target service according to a priority order and, and the central control device is further configured to receive the service invalidation signal from the edge computing device to determine that there is the service abnormal situation in the edge computing device.

16. The edge computing system according to claim 11, wherein the edge computing device is further configured to generate a service invalidation signal when the target service is down, and the central control device is further configured to receive the service invalidation signal from the edge computing device to determine that there is the service abnormal situation in the edge computing device.

17. The edge computing system according to claim 11, wherein the service abnormal situation indicates that the edge computing device is disabled, and instructing the edge computing device or the another edge computing device to transmit the target service location to the terminal device performed by the central control device is performed by transmitting the target service location to the another edge computing device.

18. The edge computing system according to claim 11, wherein the central control device is further configured to determine that the edge computing device is disabled when determining that the central control device has not received information from the edge computing device for a specific length of time.

19. The edge computing system according to claim 11, wherein re-allocating the target service to the another edge computing device according to the service abnormal situation, the target service and the operational information of the another edge computing device performed by the central control device comprises:

selecting one or more edge computing platform candidates that are able to provide the target service, wherein each of the one or more edge computing platform candidates has operational information, the another edge computing device is included in the one or more edge computing platform candidates, and the operational information comprises a resource condition and latency corresponding to the target service; and determining that the operational information of the another edge computing device is a best operational information, so selecting the another edge computing device from the one or more edge computing platform candidates.

20. The edge computing system according to claim 11, wherein the edge computing device is further configured to submit a registration request to the central control device and provide operational information of the edge computing device to the central control device before providing the terminal device with the target service, and the central control device is further configured to receive a service request from the terminal device, determine the service request corresponds to the target service, and allocate the target service to the edge computing device according to the target service and the operational information of the edge computing device before the edge computing device provides the terminal device with the target service.

* * * * *